(12) United States Patent
Ueda et al.

(10) Patent No.: US 8,014,978 B2
(45) Date of Patent: Sep. 6, 2011

(54) NUMERICAL ANALYSIS MODEL DATA GENERATING METHOD FOR FILLING HOLES IN A MESH

(75) Inventors: Akira Ueda, Kawasaki (JP); Kenichiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/509,618

(22) Filed: Aug. 25, 2006

(65) Prior Publication Data
US 2007/0005314 A1    Jan. 4, 2007

Related U.S. Application Data

(63) Continuation of application No. PCT/JP2005/001789, filed on Feb. 7, 2005.

(30) Foreign Application Priority Data

Mar. 9, 2004 (JP) .................................. 2004-065743

(51) Int. Cl.
*G06F 17/50* (2006.01)
*G06T 15/00* (2011.01)

(52) U.S. Cl. ........................................... 703/1; 345/419

(58) Field of Classification Search .................. 703/1, 2; 345/418–420
See application file for complete search history.

(56) References Cited

U.S. PATENT DOCUMENTS

| 5,936,869 | A  * | 8/1999 | Sakaguchi et al. ................. 703/1 |
| 6,727,898 | B2 * | 4/2004 | Hariya et al. .................. 345/420 |
| 2003/0067461 | A1 * | 4/2003 | Fletcher et al. .............. 345/420 |
| 2005/0057561 | A1 * | 3/2005 | El-Din ElShishiny et al. ............................. 345/419 |

FOREIGN PATENT DOCUMENTS

| JP | 5-101152 | 4/1993 |
| JP | 5-307590 | 11/1993 |
| JP | 10-255077 | 9/1998 |
| JP | 2001-155187 | 6/2001 |
| JP | 2003-167927 | 6/2003 |

OTHER PUBLICATIONS

Verdera et al., Inpainting Surface Holes, vol. 2, pp. II-903-6 vol. 314-17 Sep. 2003, Image Processing, 2003. ICIP 2003. Proceedings. 2003 International Conference., vol. 2, pp. II-903-6 vol. 3.*
J. Davis, S. Marschner, M. Garr, and M. Levoy, "Filling holes in complex surfaces using volumetric diffusion," First International Symposium on 3D Data Processing Visualization, and Transmission, Jun. 2002.*

* cited by examiner

*Primary Examiner* — Paul Rodriguez
*Assistant Examiner* — Eun Kim
(74) *Attorney, Agent, or Firm* — Staas & Halsey LLP

(57) ABSTRACT

The present invention provides a numerical analysis model data generating program, method, and system for generating numerical analysis model data, which is used for numerical analysis, on the basis of three-dimensional shape data of a structure that is an object of analysis. Three-dimensional shape data defining the structure is inputted. Holes included in the inputted three-dimensional shape data are extracted, and the size of each of the holes is calculated. If the size of a given hole is smaller than a predetermined size, the hole is filled. Thus, numerical analysis model data is generated. According to the present invention, when the numerical analysis model data is generated, a relatively small amount of analysis model data can be generated without adversely affecting the accuracy in numerical analysis.

2 Claims, 9 Drawing Sheets

- - - → LARGE HOLE THAT IS NOT FILLED
——→ SMALL HOLE THAT IS FILLED

NUMERICAL ANALYSIS MODEL DATA GENERATING METHOD FOR FILLING HOLES IN A MESH

CROSS REFERENCE TO RELATED APPLICATION

This is a Continuation of Application No. PCT/JP2005/001789 filed on Feb. 7, 2005. The entire disclosure of the prior application is hereby incorporated by reference herein.

BACKGROUND OF THE INVENTION

1. Field of the Invention

The present invention relates to a numerical analysis model data generating program, a numerical analysis model data generating method, and a numerical analysis model data generating system for generating model data, which is employed in various kinds of numerical analyses, on the basis of shape data of a three-dimensional structure. More particularly, the present invention is concerned with a numerical analysis model data generating program, method, and system for generating a relatively small amount of numerical analysis model data without adversely affecting the accuracy in a numerical analysis.

2. Description of the Related Art

Along with the trend of electronic equipment, such as a notebook personal computer or a disk drive, to have a compact and lightweight design, there is a demand for a structure for properly releasing heat dissipated by the electronic equipment. The structure has to be designed by highly accurately analyzing the behavior of heat in the electronic equipment.

As a tool to assist in carrying out analysis by using a computer, various kinds of numerical analysis software have been developed. In numerical analysis of a structure, which is to be achieved by a computer, such as heat transfer analysis, mechanism analysis, or electromagnetic field analysis, three-dimensional shape data representing the structure that is an object of numerical analysis is manually segmented into numerous polyhedral elements using a predetermined mesh in order to generate a numerical analysis model. A property value representing a property of each polyhedral element is calculated. Furthermore, the property of the entire structure is calculated as a set of property values of the respective polyhedral elements.

On the other hand, software that automatically transforms the three-dimensional shape data, representing the structure that is an object of analysis, into numerical analysis model data composed of numerous polyhedral element data items has been developed.

The automatic transformation software segments the shape of a structure that is an object of analysis, defines the upper limit of the number of polyhedral elements which are to be generated (a maximum number of polyhedral elements) as a default value, and designates the numbers of meshes or segments into which the structure is segmented in each of the directions of three axes (X, Y, and Z axes). Thus, the automatic transformation software generates numerical analysis model data that has the shape of the structure, which is an object of analysis, into numerous polyhedral elements so that the number of the generated polyhedral elements does not exceed the maximum number of polyhedral elements (default value).

Herein, when the maximum number of polyhedral elements is set to a relatively small value, the number of polyhedral elements which are to be generated by segmenting the shape of the structure that is an object of analysis becomes smaller. Therefore, an analytic speed increases but an accuracy in analysis deteriorates. In contrast, when the maximum number of polyhedral elements is set to a relatively large value, the number of polyhedral elements which are to be generated by segmenting the structure that is an object of analysis becomes larger. Consequently, the accuracy in analysis improves but the analytic speed decreases.

On the other hand, in general, when the shape of a structure that is an object of analysis is segmented using a mesh, the surface of the shape thereof is inconsistent with the surface of a mesh which is to be used to segment the shape. After the shape of the structure is segmented using a mesh, the number of polyhedral elements that are objects of analysis increases. The analytic speed therefore decreases.

In efforts to cope with the above disadvantages, an analysis model generating method and system, in which three-dimensional shape data representing a structure that is an object of analysis is segmented into numerous polyhedral elements using a mesh so that an amount of numerical analysis data will be reduced, have been disclosed in Japanese Unexamined Patent Publication (Kokai) No. 10-255077 (hereinafter referred to as Patent Document No. 1).

In the analysis model generating method described in Patent Document No. 1, a calculation domain representing a structure is defined with a superficial shape. A standardized segmentation space composed of numerous polyhedral microscopic elements is defined. Among the numerous polyhedral microscopic elements, each microscopic element in which the ratio of the volume thereof to the volume of a region included in the calculation domain is smaller than a predetermined minimum filling ratio is eliminated. A set of the remaining microscopic elements is regarded as a numerical analysis model approximated to the calculation domain.

In a numerical analysis space mesh generating system described in Japanese Unexamined Patent Publication (Kokai) No. 5-307590 (hereinafter referred to as Patent Document No. 2), an operator interactively enters map information at a computer so as to carry out a two-dimensional meshing system. Furthermore, once a simple manipulation is executed and, for example, once an analysis domain is designated or the number of segments juxtaposed in a height direction or the width of each segment is designated, a three-dimensional mesh generating unit included in the computer automatically generates three-dimensional mesh data.

Furthermore, according to a three-dimensional numerical calculation mesh generating method described in Japanese Unexamined Patent Publication (Kokai) No. 5-101152 (hereinafter referred to as Patent Document No. 3), a three-dimensional numerical calculation mesh having a complex shape is accurately generated by sweeping a two-dimensional numerical calculation mesh having a basic triangle or square shape, while perfectly controlling the movements of three or four vertices by using a guide curve.

Furthermore, according to a numerical analysis automatic mesh generating method described in Japanese Unexamined Patent Publication (Kokai) No. 2001-155187 (hereinafter referred to as Patent Document No. 4), when a three-dimensional closed space including an arbitrary shape is automatically segmented, eight component points are extracted from all the component points on a plurality of interfaces constituting the closed space. Four adjoining points out of the eight component points are used to reconstruct an interface. The number of segments is set again so that the numbers of segments on opposite sides of the interface will be equal. The reconstructed interface is automatically segmented into units of a square elements. Square elements, which are contained in adjoining sections and are opposed to each other, are used to define a given hexahedral element in a space. Thus, a given hexahedral element is automatically generated in the three-dimensional closed space.

For example, according to the analysis model generating method described in Patent Document No. 1, microscopic elements whose filling ratios are smaller than the predetermined minimal filling ratios are extracted from defined polyhedral microscopic elements. The extracted microscopic elements, that is, a numerical analysis model in which data representing a microscopic projection or the like and not adversely affecting an accuracy in analysis are deleted is used to carry out numerical analysis. Consequently, while the accuracy in analysis is maintained, a high analytic speed can be assured.

However, an ordinary structure that is an object of analysis includes numerous microscopic holes, such as screw holes. Therefore, the conventional numerical analysis model data generating method described in Patent Document No. 1 causes a problem in that the holes bring about an increase in an amount of data representing the structure and eventually increase the time required for numerical analysis. For example, the results of heat transfer analysis carried out by using a numerical analysis model of a structure in which microscopic holes, such as microscopic hollows or notches, do not exist are substantially identical to the results of heat transfer analysis carried out by using a numerical analysis model of a structure having microscopic holes and having substantially the same shape. However, when heat transfer analysis is carried out by using the latter numerical analysis model, as the numerical analysis model includes microscopic holes, an amount of data, or eventually, a numerical analysis time becomes larger than that required when heat transfer analysis is carried out by using the former numerical analysis model.

On the other hand, in each of Patent Documents No. 2 to No. 4, when a numerical analysis model is generated, microscopic holes, such as microscopic hollows or notches, are not taken into consideration. Therefore, in each of these Patent Documents, a problem similar to a problem caused by Patent Document No. 1 may occur.

A conventional numerical analysis model data generating method and the underlying problems will be described later with reference to the appended drawings.

SUMMARY OF THE INVENTION

An object of the present invention is to provide a numerical analysis model data generating program, a numerical analysis model data generating method, and a numerical analysis model data generating system that, when numerical analysis model data is generated based on three-dimensional shape data representing a structure that is an object of analysis, can generate a relatively small amount of numerical analysis model data without adversely affecting the accuracy in a numerical analysis.

In order to attain the above object, according to the first aspect of the present invention, there is provided a numerical analysis model data generating program that generates numerical analysis model data, which is used for numerical analysis, on the basis of three-dimensional shape data representing a structure that is an object of analysis. The numerical analysis model data generating program includes a step of inputting three-dimensional data that defines a structure; a step of extracting holes included in the inputted three-dimensional shape data and determining the size of each of the holes; and a step of, if the size of a given hole is smaller than a predetermined size, filling the given hole and thus generating numerical analysis model data.

According to the second aspect of the present invention, there is provided a numerical analysis model data generating method that generates numerical analysis model data, which is used for numerical analysis, on the basis of three-dimensional shape data representing a structure that is an object of analysis. In the numerical analysis model data generating method, three-dimensional shape data defining a structure is inputted. Holes included in the inputted three-dimensional shape data are extracted and the size of each of the holes are determined. If the size of a given hole is smaller than a predetermined size, the given hole is filled. Thus, numerical analysis model data is generated.

According to the third aspect of the present invention, there is provided a numerical analysis model data generating system that generates numerical analysis model data, which is used for numerical analysis, on the basis of three-dimensional shape data representing a structure that is an object of analysis. The numerical analysis model data generating system comprises a shape data input unit for inputting three-dimensional shape data that defines a structure; a hole extracting unit for extracting holes included in the inputted three-dimensional shape data; and a simplifying unit for determining the size of each of the extracted holes, and for filling a given hole in the case in which the size of the given hole is smaller than a predetermined size. Three-dimensional shape data simplified by the simplifying unit is provided as numerical analysis model data.

According to the fourth aspect of the present invention, there is provided a numerical analysis model data generating method that generates numerical analysis model data, which is used for numerical analysis, on the basis of three-dimensional shape data representing a structure that is an object of analysis. In the numerical analysis model data generating method, three-dimensional shape data defining a structure is inputted. The inputted three-dimensional shape data is segmented into a plurality of (or numerous) polyhedral microscopic elements using a predetermined mesh defined as an analytic unit in a three-dimensional space. The ratio of the volume of a microscopic element, which forms each of the polyhedral microscopic elements, to the volume of a substantial analytic unit is determined. A microscopic element in which the ratio of the volume thereof to the volume of the substantial analytic unit is larger than a predetermined maximum filling ratio is transformed into a filled microscopic element. A set of all the microscopic elements including the filled microscopic element is provided as numerical analysis model data.

According to the fifth aspect of the present invention, there is provided a numerical analysis model data generating system that generates numerical analysis model data, which is used for numerical analysis, on the basis of three-dimensional shape data defining a structure that is an object of analysis. The numerical analysis model data generating system comprises a shape data input unit for inputting three-dimensional shape data that defines a structure; a polyhedral microscopic element generating unit for segmenting the inputted three-dimensional shape data using a predetermined mesh defined as an analytic unit in a three-dimensional space so as to generate a plurality of polyhedral microscopic elements; and a simplifying unit for determining the ratio of the volume of a microscopic element, which forms each of the polyhedral microscopic elements, to the volume of a substantial analytic unit, and for transforming a microscopic element in which the ratio of the volume thereof to the volume of the substantial analytic unit is larger than a predetermined maximum filling ratio, into a filled microscopic element. The three-dimensional shape data which the simplification unit has simplified, based on a set of all the microscopic elements including the filled microscopic element, is provided as numerical analysis model data.

According to the present invention, when three-dimensional shape data defining a structure that is an object of numerical analysis is transformed into numerical analysis model data, a microscopic hole that does not adversely affect the accuracy in numerical analysis even when it is filled is filled in order to reduce an amount of numerical analysis model data. Thus, a numerical analysis time is shortened.

BRIEF DESCRIPTION OF THE DRAWINGS

The above object and features of the present invention will be more apparent from the following description of some preferred embodiments with reference to the accompanying drawings, wherein.

DESCRIPTION OF THE PREFERRED
EMBODIMENTS

Prior to a description of an embodiment of a numerical analysis model data generating method, or the like, according to the present invention, a conventional numerical analysis model data generating system and the underlying problems will be mentioned with reference to the appended drawings (FIG. 1 to FIG. 4).

Referring to FIG. 1 to FIG. 4, a process of generating a numerical analysis model described in Patent Document No. 1 will be described below.

Figure 1:
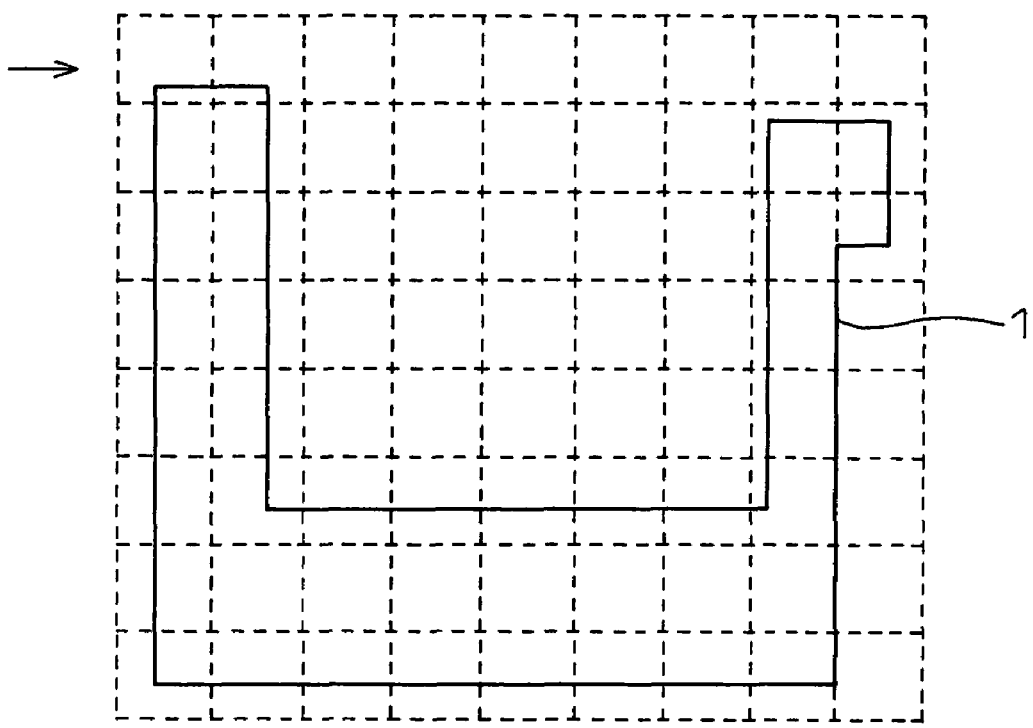
FIG. 1 is a conceptual diagram showing an example of a structure 1 segmented using a mesh according to a conventional numerical analysis model data generating method.

FIG. 1 is a conceptual diagram showing an example of a structure 1, which is segmented using a mesh, according to a conventional numerical analysis model data generating method. In FIG. 1, the structure 1 that is an object of analysis is segmented using a mesh in order to generate numerous polyhedral microscopic elements. In general, the structure 1 that is an object of analysis has a three-dimensional shape. For brevity, the structure 1 is represented by two-dimensional shape data alone. In FIG. 1, a solid line delineates the shape of the structure 1, and dashed lines indicate a standardized segmentation space to which the structure 1 is mapped. In this case, the two right and left polyhedral microscopic elements pointed out by an arrow are microscopic elements whose filling ratios are smaller than predetermined minimum filling ratios.

Figure 2:
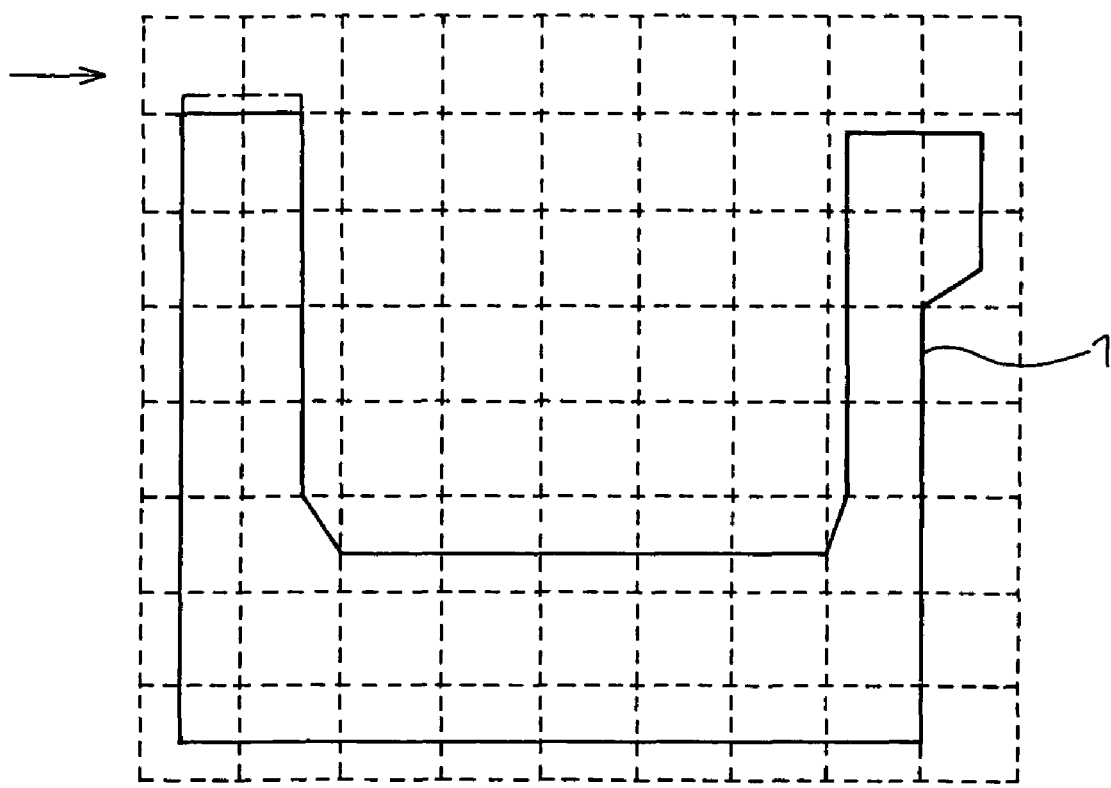
FIG. 2 is a conceptual diagram showing a numerical analysis model approximated to the structure 1, which is segmented using a mesh, according to the conventional numerical analysis model data generating method.

FIG. 2 is a conceptual diagram showing a numerical analysis model approximated to the structure 1, which is segmented using a mesh, according to the conventional numerical analysis model data generating method. Shown in FIG. 2 is a numerical analysis model approximated to the structure 1, which is segmented using the mesh in order to generate polyhedral microscopic elements as shown in FIG. 1, according to the method described in Patent Document No. 1. Incidentally, Patent Document No. 1 describes the method using a term "numerical analysis model". Therefore, when the conventional method is described, the term "numerical analysis model" will be substituted for the term "numerical analysis model data" employed in the present invention. In the example shown in FIG. 2, with regard to microscopic elements drawn with a dot-dash line and pointed out by an arrow, their filling ratios are smaller than the predetermined minimum filling ratios. Therefore, the above microscopic elements are deleted. Moreover, in the example shown in FIG. 2, as the above microscopic elements are deleted, the left vertex of the structure 1 is moved downward. Thus, a simplified numerical analysis model is generated.

Figure 3:
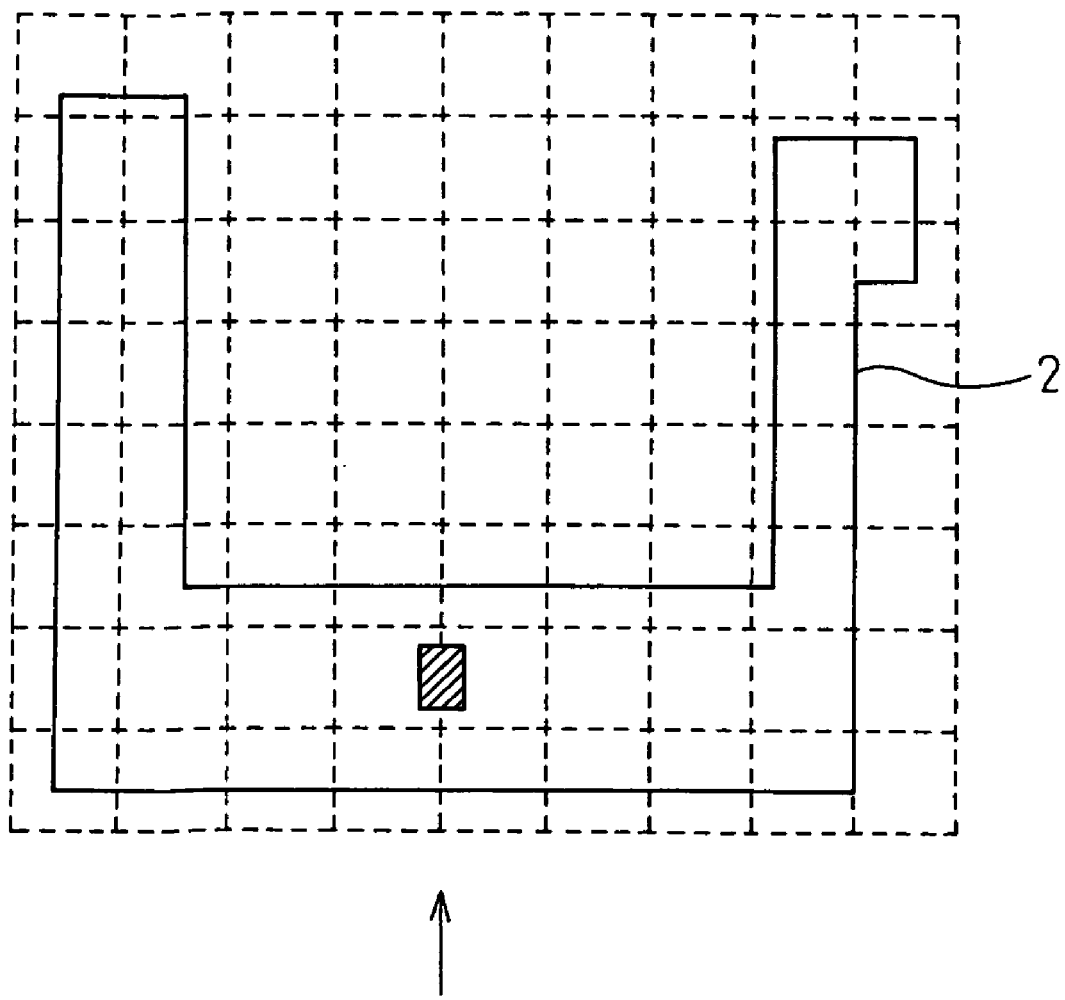
FIG. 3 is a conceptual diagram showing an example of a structure 2, which is segmented using a mesh, according to the conventional numerical analysis model data generating method.

FIG. 3 is a conceptual diagram showing an example of a structure 2 which is segmented using a mesh according to the conventional numerical analysis model data generating method. Herein, the structure 2 including a microscopic hole, which is too small to adversely affect an accuracy in analysis and is shown hatched and pointed out by an arrow, is presented as a structure that is an object of analysis. In FIG. 3, the structure 2 that is an object of analysis is segmented using a mesh as it is in order to generate numerous polyhedral microscopic elements.

Figure 4:
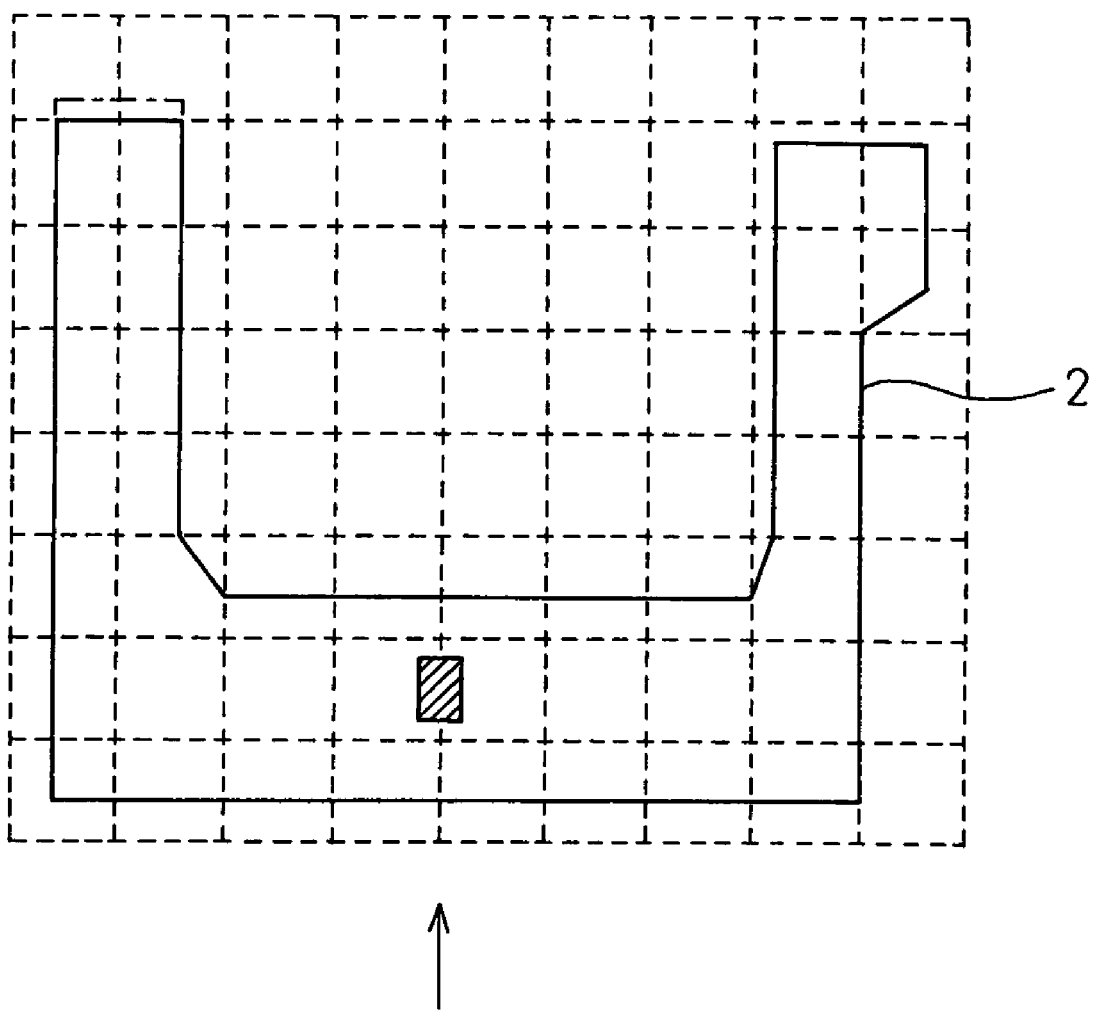
FIG. 4 is a conceptual diagram showing a numerical analysis model approximated to the structure 2, which is segmented using a mesh, according to the conventional numerical analysis model data generating method.

FIG. 4 is a conceptual diagram showing a numerical analysis model approximated to the structure 2, which is segmented using a mesh, according to the conventional numerical analysis model data generating method. Shown in FIG. 4 is a numerical analysis model approximated to the structure 2, which is segmented using the mesh in order to generate polyhedral microscopic elements as shown in FIG. 3, according to the method described in Patent Document No. 1. In the example shown in FIG. 4, similarly to the model of the structure 1 shown in FIG. 2, the numerical analysis model is simplified by deleting microscopic elements indicated with a dot-dash line and moving the left vertex of the structure 2 downward. However, in the example shown in FIG. 4, the analysis model is generated with a microscopic hole pointed out by an arrow left intact.

Herein, it should be noted that a normal structure includes numerous microscopic holes, such as screw holes. For example, according to the conventional method (method described in Patent Document No. 1) illustrated in FIG. 4, a microscopic hole is left intact. The presence of holes brings about an increase in an amount of data representing a structure. Eventually, the time required for numerical analysis is increased. With regard to microscopic holes included in an ordinary structure, such as microscopic hollows or notches, as long as their sizes are smaller than the predetermined sizes, even if they are filled (that is, even if data representing the microscopic holes are deleted), the heat transfer property of the structure is known to remain unaffected. For example, the results of heat transfer analysis carried out on the numerical analysis model of the structure 1 devoid of a microscopic hole as shown in FIG. 2 are substantially identical to the results of heat transfer analysis carried out on the numerical analysis model of the structure 2 having a microscopic hole and having substantially the same shape as the structure 1. However, as the numerical analysis model of the structure 2 includes the microscopic hole, a larger amount of data, or eventually, a longer numerical analysis time is needed than when heat transfer analysis is carried out on the numerical analysis mode of the structure 1.

Referring to FIG. 5 to FIG. 9, an embodiment of a numerical analysis model data generating method according to the present invention will be described below.

Figure 5:
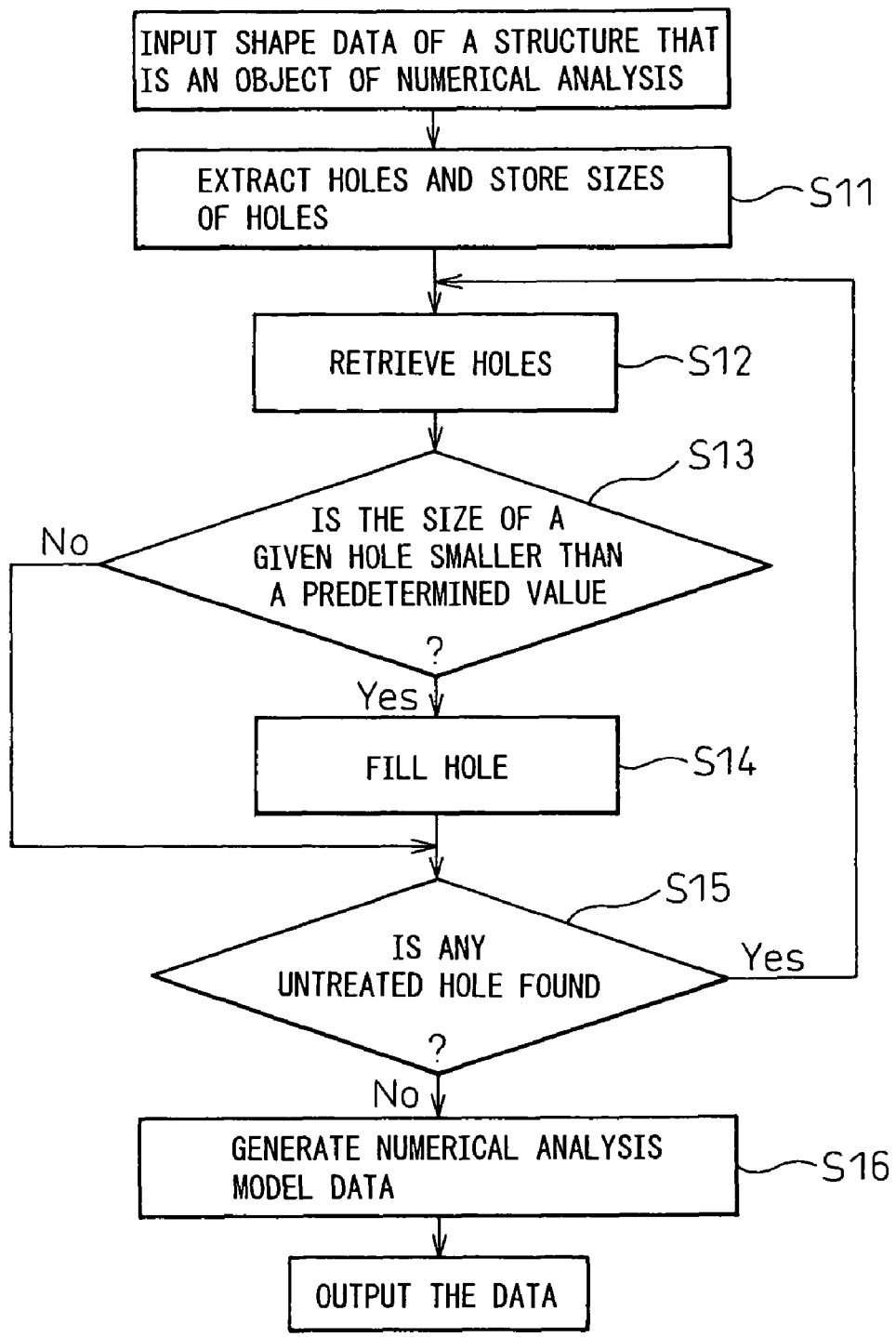
FIG. 5 is a flowchart describing a processing flow of the numerical analysis model data generation based on the principle of the present invention.

FIG. 5 is a flowchart describing a processing flow of the numerical analysis model data generation based on the principle of the present invention. Herein, the flowchart describes the processing flow of generating numerical analysis model data on the basis of a numerical analysis model data generating program in accordance with the first aspect of the present invention residing in a computer (or a numerical analysis model data generating method in accordance with the second or fourth aspect of the present invention).

As described in the flowchart of FIG. 5, when a computer is used to generate numerical analysis model data, three-dimensional shape data representing a structure that is an object of numerical analysis is first inputted. Thereafter, at step S11, one or a plurality of holes included in the structure that are an object of analysis are extracted, and the sizes of the respective holes are stored in a memory, such as a random access memory (RAM) or an external storage device. Furthermore, at step S12, the holes stored in the memory are retrieved. At step S13, the size of each of the holes, e.g., the volume thereof, is compared with a predetermined value. If the size of a given hole that is an object of comparison is smaller than the predetermined value, the given hole is filled at step S14. If the size is larger than the predetermined value, the hole is left intact and the process is passed to step S15.

At step S15, it is determined whether or not an untreated hole is found. If the untreated hole is found, the process is returned to step S12 and the process for retrieving a hole is resumed. On the other hand, if the untreated hole is not found at step S15, the process is passed to step S16. The results of the process carried out at steps S11 to S15 are generated as numerical analysis model data. The thus generated numerical analysis model data is finally transmitted from the computer.

Figure 6:
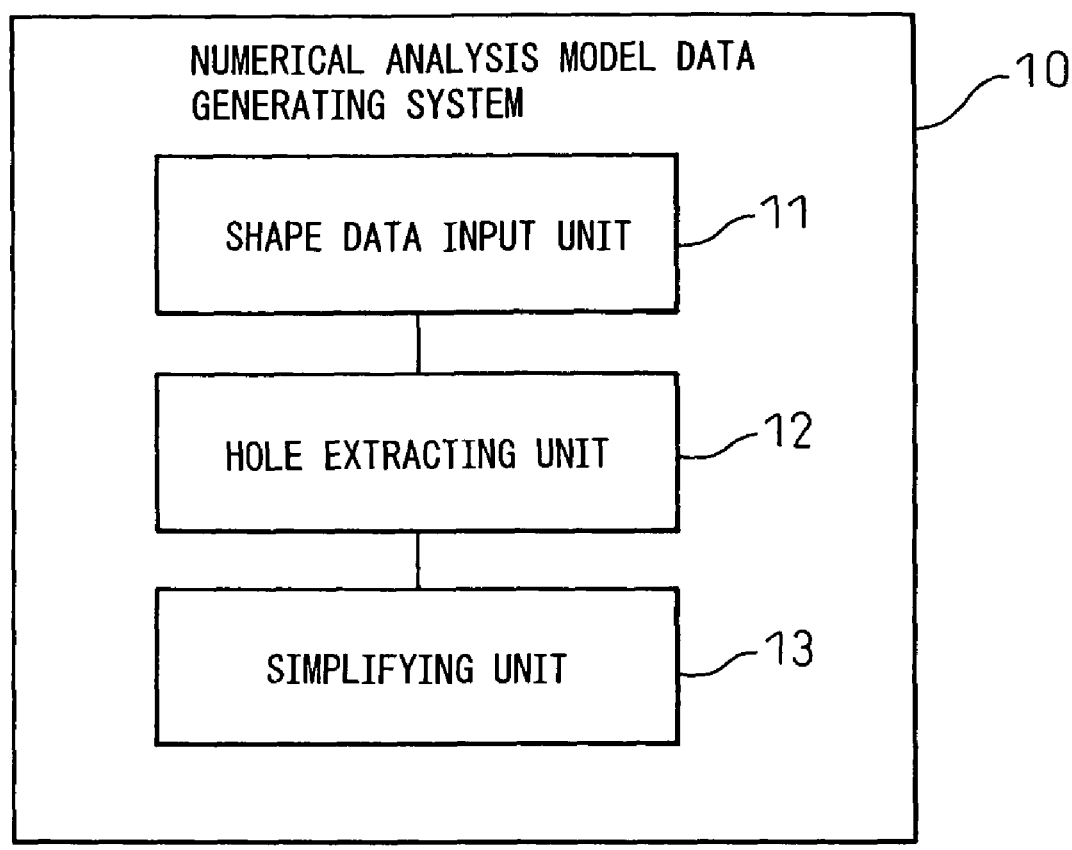
FIG. 6 is a block diagram showing the configuration of an embodiment of a numerical analysis model data generating system according to the present invention.

FIG. 6 is a block diagram showing the configuration of an embodiment of a numerical analysis model data generating system according to the present invention. Herein, the configuration of a numerical analysis model data generating system 10 in accordance with the third aspect of the present invention is shown schematically.

In the numerical analysis model data generating system 10 shown in FIG. 6, a shape data input unit 11 has the function of inputting three-dimensional shape data defining a structure that is an object of analysis. A hole extracting unit 12 has the function of extracting one or a plurality of holes contained in the three-dimensional data inputted by the shape data input unit 11. A simplifying unit 13 has the function of calculating the size of each of the holes extracted by the hole extracting unit 12, and to fill a hole in a case in which the size of the hole is smaller than a predetermined size. In the numerical analysis model data generating system 10, three-dimensional shape data simplified by the simplifying unit 13 is provided as numerical analysis model data.

Preferably, the numerical analysis model data generating system 10 shown in FIG. 6 includes a central processing unit (CPU) and a memory, such as a RAM, a read-only memory (ROM), or an external storage device, which are included in a computer. More specifically, the shape data input unit 11, hole extracting unit 12, and simplifying unit 13 included in the numerical analysis model data generating system 10 function when the CPU reads a program (for example, a numerical analysis model data generating program for executing the processing flow described in FIG. 5), which is stored in advance in the memory, and enables the program to execute the predetermined processing flow. In short, the shape data input unit 11, hole extracting unit 12, and simplifying unit 13 are implemented by software which is installed in a computer.

As another embodiment (not shown), a numerical analysis model data generating system (a numerical analysis model data generating system in accordance with the fifth aspect of the present invention) includes a shape data input unit for inputting three-dimensional shape data that defines a structure which is an object of analysis; a polyhedral microscopic element generating unit for segmenting the inputted three-dimensional shape data using a predetermined mesh defined as an analytic unit in a three-dimensional space so as to generate numerous polyhedral microscopic elements; and a simplifying unit for determining the ratio of the volume of a microscopic element, which forms each of the polyhedral microscopic elements, to the volume of a substantial analytic unit, and for transforming a microscopic element in which the ratio of the volume thereof to the volume of the substantial analytic unit is larger than a predetermined maximum filling ratio, into a filled microscopic element. In the present embodiment, three-dimensional shape data which the simplifying unit has simplified based on a set of all microscopic elements including the filled microscopic element is provided as numerical analysis model data.

More specifically, in the present embodiment, the actual volume of each of numerous polyhedral microscopic elements resulting from segmentation based on a mesh is compared with the volume of a microscopic element that is a substantial analytic unit, in order to determine the ratio of the volume of the microscopic element to the volume of the microscopic element that is the substantial analytic unit. Herein, even when the microscopic element that is an object of determination includes a hole, if the volume of the hole is smaller than a predetermined value, the ratio of the volume of the microscopic element to the volume of the microscopic element that is the substantial analytic unit is larger than the predetermined maximum filling ratio. Therefore, the simplifying unit determines that the filling operation of the hole in the microscopic element would not adversely affect the accuracy in numerical analysis, and transforms the microscopic element, in which the hole exists, into a microscopic element having the hole filled.

Figure 7:
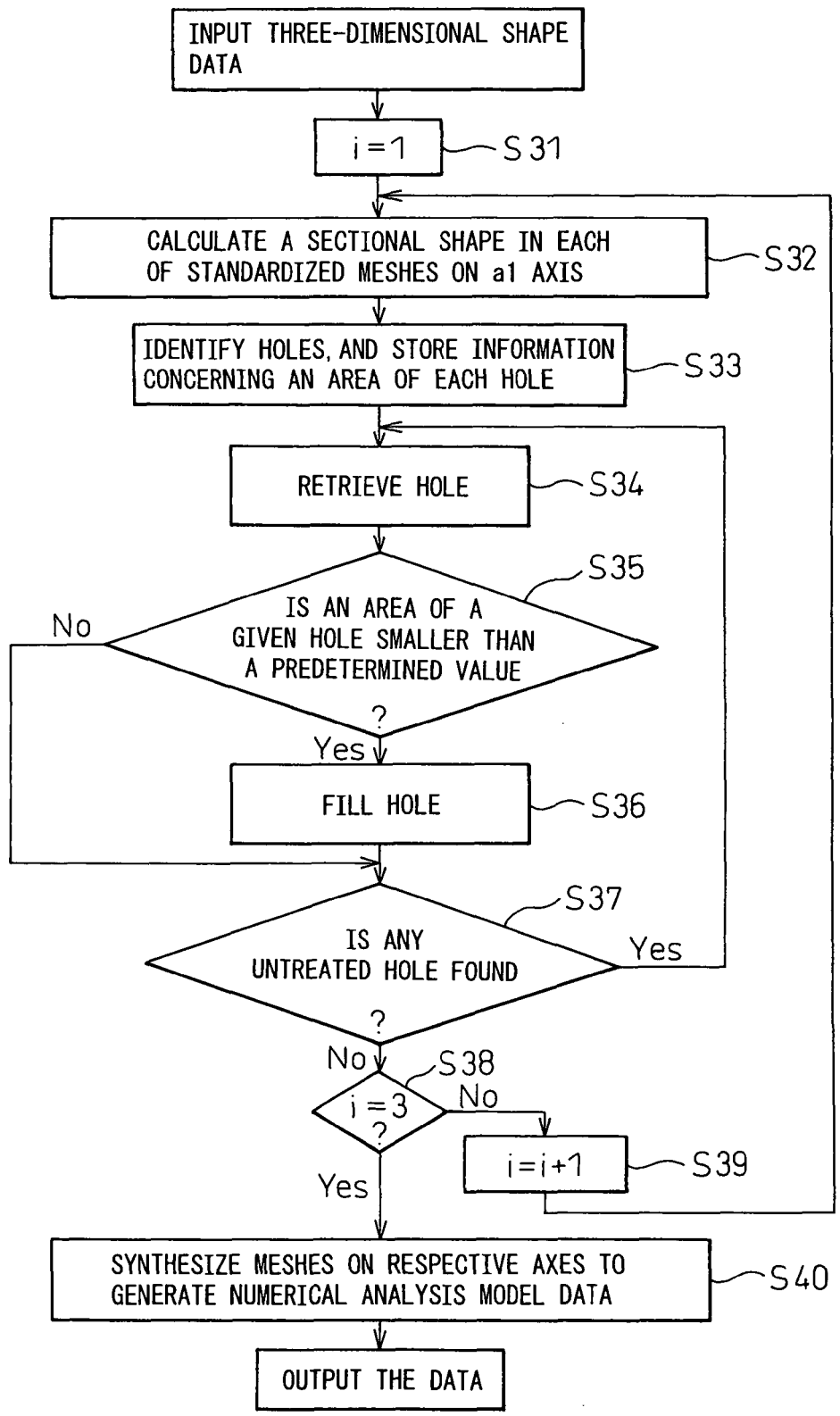
FIG. 7 is a flowchart describing an embodiment of the numerical analysis model data generating system according to the present invention.

FIG. 7 is a flowchart describing an embodiment of a numerical analysis model data generating method according to the present invention. Herein, the flowchart describes the embodiment of the numerical analysis model data generating method according to the present invention for generating numerical analysis model data, which is used for numerical analysis, on the basis of three-dimensional shape data defined in a coordinate system having three axes a1 to a3 (i denotes a value ranging from 1 to 3).

As described in the flowchart of FIG. 7, when the computer is used to generate numerical analysis model data, three-dimensional shape data representing a structure that is an object of numerical analysis is input. Thereafter, at step S31, a1 (i=1) (for example, the X axis) is designated as an initial value indicating any one of the three axes along which the numerical analysis model data generation is carried out. At step S32, the sectional shapes of the structure distinguished by respective predetermined meshes are determined in units of the predetermined standardized meshes defined on each axis. At step S33, one or a plurality of holes included in each sectional shape is identified, and information concerning the area of each hole is stored in the memory. At step S34, the stored holes are sequentially retrieved. At step S35, it is determined whether or not the area of a given hole is smaller than a predetermined value (area of a given hole<predetermined value). If it is determined that the area of the given hole is smaller than the predetermined value at step S35, the given hole is recognized as being homogeneous with the structure and then filled (namely, the hole data is deleted).

If the area of the hole is determined to be equal to or larger than the predetermined value at step S35, the process is passed to step S37. At step S37, it is determined whether or not any untreated hole is found. If the untreated hole is found, the process is returned to step S34 and the process for retrieving a hole is resumed. On the other hand, if an untreated hole is not found at step S37, the process is passed to step S38. It is determined whether or not the process which is to be carried out on the third axis (i=1) (for example, the Z axis) is completed.

If it is determined that the process which is to be carried out on the third axis is not completed at step S38, the axis number is incremented by one (i=i+1) (for example, from the X axis to the Y axis or from the Y axis to the Z axis) at step S39. The process is then returned to step S32. On the other hand, if it is determined that the process which is to be carried out on the third axis is completed at step S38, the process is passed to step S40. The sectional shapes (meshes) on the respective axes distinguished by the respective predetermined standardized meshes are synthesized in order to generate numeric analysis model data. The thus generated numerical analysis model data is finally transmitted from the computer.

According to the process described in the flowchart of FIG. 7, a hole shown as a hatched area and included in the numerical analysis model approximated to the structure 2 as shown in FIG. 4 can be filled. Consequently, an amount of numerical analysis model data can be reduced and a numerical analysis time can be shortened.

Figure 8:
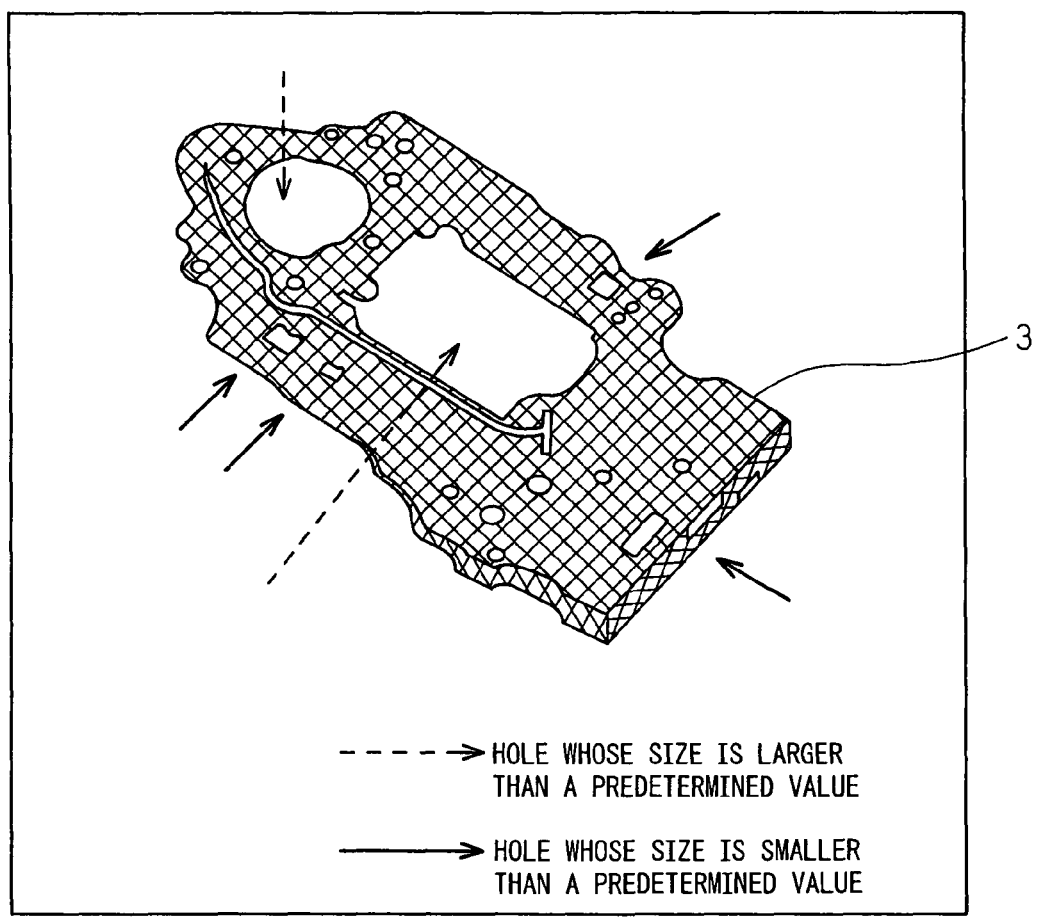
FIG. 8 is a perspective view showing an example of a structure that is an object of numerical analysis.

FIG. 8 is a perspective view showing an example of a structure that is an object of numerical analysis. In FIG. 8, each hole pointed out by the arrowhead of an arrow drawn with a dashed line is a hole whose size is recognized as being larger than the predetermined value. Each hole located on the extension of an arrow drawn with a solid line is a hole whose size is recognized as being smaller than the predetermined value. Three-dimensional shape data representing a structure 3 that is an object of numeric analysis is inputted and segmented using a predetermined standardized mesh. Thereafter, the sectional shapes of the structure 3 are determined in units of the standardized meshes.

Figure 9:
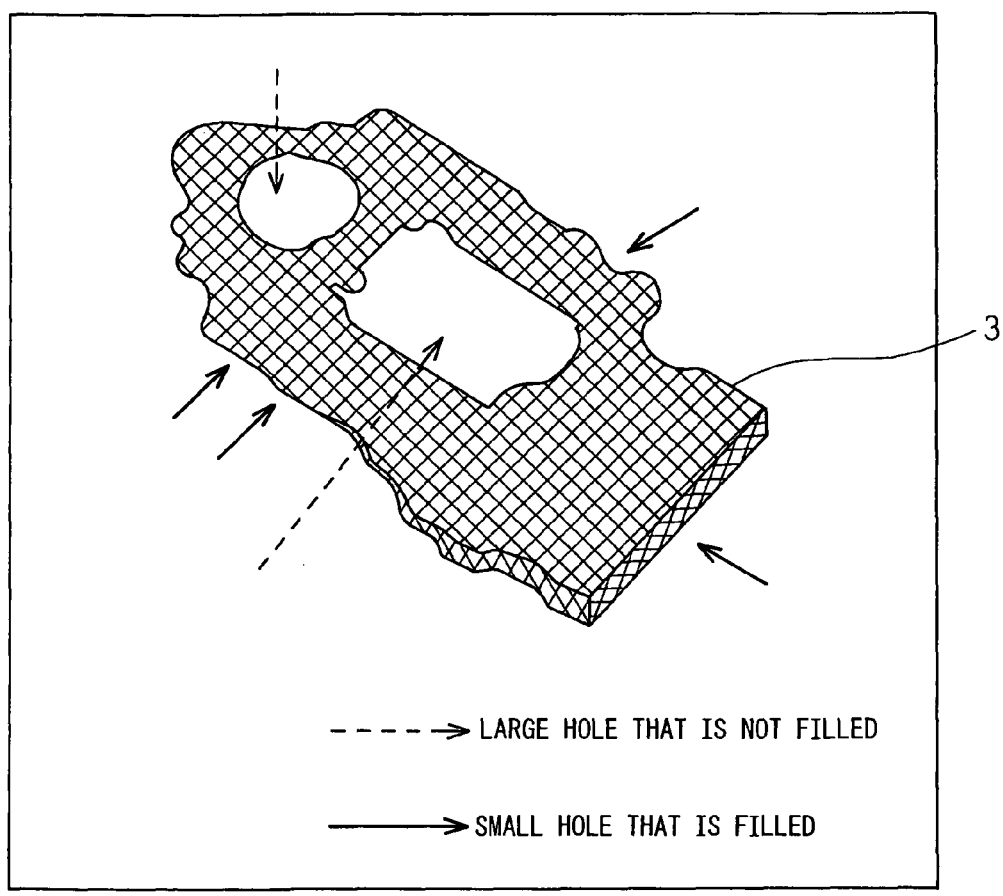
FIG. 9 is a conceptual diagram showing an example of numerical analysis model data generated by simplifying the example of the structure that is shown as an object of numerical analysis in FIG. 8.

FIG. 9 is a conceptual diagram showing an example of numerical analysis model data generated by simplifying the three-dimensional shape data representing the structure that is shown in FIG. 8 as an object of numerical analysis. Herein, the three-dimensional shape data representing the structure 3 and being simplified by carrying out the process described in the flowchart of FIG. 7 is shown as numerical analysis model data employed in the present invention.

In FIG. 9, each hole pointed out by the arrowhead of an arrow drawn with a dashed line is a hole that is left intact but are not filled because the size of each hole is recognized as being larger than the predetermined value. On the other hand, each hole located on the extension of an arrow drawn with a solid line and shown in FIG. 8 is filled because the size of each hole is recognized as being smaller than the predetermined value. The hole data regarding the latter hole are deleted. Consequently, in FIG. 9, the holes existing on the extensions of the arrows drawn with the solid lines have all disappeared.

Incidentally, if the shape of a structure that is an object of numerical analysis is defined in a polar coordinate system, a cylindrical coordinate system, or any other coordinate system, the specific coordinate system in which the shape of the structure that is an object of analysis is defined should preferably be adopted as a coordinate system in which numerical analysis model data is generated.

According to the embodiment of the numerical analysis model data generating method according to the present invention, when numerical analysis model data is generated based on three-dimensional shape data representing a structure that is an object of analysis, numerous microscopic holes, such as screw holes, included in the structure that is an object of analysis are filled, that is, the hole date regarding these holes are deleted. Consequently, a small amount of numerical analysis model data can be generated without an adverse effect on the accuracy in numerical analysis. As a result, the time required for numerical analysis can be shortened without an adverse effect on the accuracy in numerical analysis. Eventually, a numerical analysis speed is increased. Thus, the present invention will prove very helpful for generating numerical analysis model data in various technical fields.

The invention claimed is:

1. A computer-implemented numerical analysis model data generating method comprising:
inputting three-dimensional shape data that defines a structure;
segmenting the inputted three-dimensional shape data using into three-dimensional polyhedral microscopic elements by using a three-dimensional meshed pattern, a mesh of the meshed pattern defined as an analytic unit;
determining a ratio of a volume of a microscopic element of the polyhedral microscopic elements in the mesh to a volume of the mesh;
comparing the ratio of the volume of the microscopic element with a predetermined maximum filling ratio;
transforming the microscopic element having the ratio of the volume larger than the predetermined maximum filling ratio into a microscopic element without a hole by deleting data corresponding to the hole in the mesh; and
providing as the numerical analysis model data a set of all the microscopic elements including the microscopic element without a hole.

2. A non-transitory computer readable medium storing a computer program that causes a computer to execute a numerical analysis model data generating method, the method comprising:

inputting three-dimensional shape data that defines a structure;

segmenting the inputted three-dimensional shape data into three-dimensional polyhedral microscopic elements by using a three-dimensional mesh pattern, a mesh of the mesh pattern defined as an analytical unit;

determining a ratio of a volume of a microscopic element of the polyhedral microscopic elements in the mesh to a volume of the mesh;

comparing the ratio of the volume of the microscopic element with a predetermined maximum filing ratio;

transforming the microscopic element having the ratio of the volume larger than the predetermined maximum filing ratio into a microscopic element without a hole by deleting data corresponding to the hole in the mesh; and providing as the numerical analysis model data a set of all the microscopic elements including the microscopic element without a hole.

* * * * *

UNITED STATES PATENT AND TRADEMARK OFFICE
CERTIFICATE OF CORRECTION

PATENT NO. : 8,014,978 B2
APPLICATION NO. : 11/509618
DATED : September 6, 2011
INVENTOR(S) : Akira Ueda et al.

It is certified that error appears in the above-identified patent and that said Letters Patent is hereby corrected as shown below:

Column 12, Line 2, in Claim 2, delete "filing" and insert --filling--, therefor.

Column 12, Line 4-5 (Approx.), in Claim 2, delete "filing" and insert --filling--, therefor.

Signed and Sealed this
Twenty-second Day of November, 2011

David J. Kappos
*Director of the United States Patent and Trademark Office*